(12) United States Patent
Arcieri et al.

(10) Patent No.: US 9,361,621 B2
(45) Date of Patent: Jun. 7, 2016

(54) SYSTEM AND METHOD FOR IMPROVING RELIABILITY OF DISTRIBUTED ELECTRONIC TRANSACTIONS

(71) Applicant: A.T.S. R & L S.R.L. I.S., Rome (IT)

(72) Inventors: Franco Arcieri, Rome (IT); Maurizio Talamo, Rome (IT); Guido Maria Marinelli, Rome (IT); Daniela Merella, Rome (IT)

(73) Assignee: Konvax Corporation, Cambridge, MA (US)

( * ) Notice: Subject to any disclaimer, the term of this patent is extended or adjusted under 35 U.S.C. 154(b) by 0 days.

(21) Appl. No.: 14/042,555

(22) Filed: Sep. 30, 2013

(65) Prior Publication Data

US 2014/0143148 A1        May 22, 2014

Related U.S. Application Data

(63) Continuation of application No. 13/213,600, filed on Aug. 19, 2011, now abandoned, which is a continuation of application No. 12/537,660, filed on Aug. 7, 2009, now Pat. No. 8,024,199, which is a continuation of application No. 10/882,155, filed on Jun. 30, 2004, now Pat. No. 7,593,901.

(51) Int. Cl.
*G06Q 30/00*        (2012.01)
*G06Q 20/40*        (2012.01)
(Continued)

(52) U.S. Cl.
CPC .............. *G06Q 20/401* (2013.01); *G06Q 20/10* (2013.01); *G06Q 20/40* (2013.01); *G06Q 30/00* (2013.01); *G06Q 50/22* (2013.01)

(58) Field of Classification Search
CPC ... G06Q 30/02; G06Q 50/22; G06F 17/30867
USPC .................................................. 705/44, 2, 3
See application file for complete search history.

(56) References Cited

U.S. PATENT DOCUMENTS

| 5,790,677 A | 8/1998 | Fox et al. |
| 5,793,028 A | 8/1998 | Wagener et al. |

(Continued)

FOREIGN PATENT DOCUMENTS

| WO | 98/36532 A1 | 8/1998 |
| WO | 00/10142 A1 | 2/2000 |
| WO | 00/10304 A1 | 2/2000 |

OTHER PUBLICATIONS

Ibbotson, John SOAP version 1.2 Usage Scenarios, http://www.w3.org/TR/xmlp-scenarios-20030730, Sections 2.3-2.7 (2003).

(Continued)

*Primary Examiner* — Hiep V Nguyen
(74) *Attorney, Agent, or Firm* — Locke Lord LLP; Rory J. Radding; Judy Naamat

(57) ABSTRACT

A system and method are disclosed that separate control functionality from the management functionality for conducting electronic transactions. The control functions are performed by a third party resulting in a low overhead since significant overhead is incurred in response to an anomalous event, thus facilitating high throughput electronic transactions when anomalous events are infrequent. Further, the third party does not need to have access to confidential information since it only controls by observing, validating and certifying the observed communications in a specified manner to prevent confidential information from leaving the context of the transaction. Management of the transactions based on consideration of substantive information is provided by the participants. A preferred system of the invention comprises a validation authority, a logical boundary at which validation authority undertakes control of communications, and validation rules specifying parameters for observation and the nature of comparisons.

26 Claims, 10 Drawing Sheets

(51) Int. Cl.
  *G06Q 20/10* (2012.01)
  *G06Q 50/22* (2012.01)

(56) References Cited

U.S. PATENT DOCUMENTS

| | | | |
|---|---|---|---|
| 5,903,721 A | 5/1999 | Sixtus | |
| 5,903,878 A | 5/1999 | Talati et al. | |
| 6,199,052 B1 | 3/2001 | Mitty et al. | |
| 6,327,656 B2 | 12/2001 | Zabetian | |
| 6,560,581 B1 | 5/2003 | Fox et al. | |
| 6,879,593 B1* | 4/2005 | Kunze et al. | 370/401 |
| 6,938,080 B1* | 8/2005 | Kahveci et al. | 709/223 |
| 7,000,105 B2 | 2/2006 | Tallent, Jr. et al. | |
| 7,178,149 B2 | 2/2007 | Hansen | |
| 2002/0007346 A1 | 1/2002 | Qiu et al. | |
| 2002/0029200 A1 | 3/2002 | Dulin et al. | |
| 2002/0111913 A1 | 8/2002 | Tallent et al. | |
| 2003/0195857 A1 | 10/2003 | Acquisti | |
| 2004/0258232 A1 | 12/2004 | Shvadron | |
| 2005/0188072 A1* | 8/2005 | Lee et al. | 709/223 |

OTHER PUBLICATIONS

Martin et al., SOAP version 1.2 Part 2: Adjuncts, http://www.w3.org/TR/2003/REC-soap12-part2-20030624, Sections 6.1-6.5 (2003).

* cited by examiner

SYSTEM AND METHOD FOR IMPROVING RELIABILITY OF DISTRIBUTED ELECTRONIC TRANSACTIONS

REFERENCE TO RELATED APPLICATIONS

This application is a continuation application of U.S. patent application Ser. No. 13/213,600, filed Aug. 19, 2011, which is a continuation of U.S. patent application Ser. No. 12/537,660, filed Aug. 7, 2009, now U.S. Pat. No. 8,024,199, issued Sep. 20, 2011, which is a continuation of U.S. patent application Ser. No. 10/882,155, filed Jun. 30, 2004, now U.S. Pat. No. 7,593,901, issued Sep. 22, 2009, the contents of which are incorporated herein by reference in its entirety.

FIELD OF THE INVENTION

The present invention relates generally to the field of electronic business transactions, and in particular to methods and systems for providing secure, reliable and efficient distributed electronic business transactions.

BACKGROUND OF THE INVENTION

Fueled by the growth of Internet, more and more private, commercial and governmental organizations strive to interact, conduct business, and provide various services electronically that go beyond merely providing access to information. Individuals share files through e-mails, personal websites and exchange information in online chat rooms. Small and large business provide plethora of online services including virtual retail and wholesale stores, personal electronic banking and investment services, online reservation services, etc. Government agencies also utilize widespread public access to Internet to provide such online services as renewal of driver licenses, electronic filing of taxes and even patent applications. Thus, the Internet has become more than just a pipeline for sending data, it has become a medium for conducting electronic transactions that promise speed and high throughput.

As the frequency and complexity of online business transactions grow, the task of assuring the security and reliability of such transactions becomes increasingly difficult. High throughput or speed often results in reduced security and even security breaches. For instance, a typical online purchase transaction may involve a buyer requesting purchase of particular goods; a seller checking availability of the goods; the buyer transmitting billing information to the seller; the seller billing buyer's credit card or bank account; the seller requesting shipment of goods from a delivery service, and finally shipping the goods. If this process is required to be speeded up, then it is imperative that the buyer provide confidential information over the Internet to the seller or alternatively the seller limit sales to alternatively authenticated buyers, such as existing customers, or offer goods under control of another Web retailing site such as Amazon.com and the like. The seller could also ship goods or provide access to services on little more than a prayer and a hope. In the event there is a dispute, there is no clear method for determining the nature of the transaction other the records of each of the parties themselves.

Moreover, due to significant back-end processing conducted by each party in the course of a complex electronic transaction, a virus or a hacker attack or a failure of an application, system or network may disrupt any part of the transaction with the result that one or more parties may be unsure of their rights and remedies or the status of the transaction. Faced with such a disruption, there is no clear method for determining the nature of the disruption and its effect on the transaction other than the records of the parties themselves.

To mitigate these problems, parties to the electronic business transaction sometimes rely on trusted-third-party services. Usually such a service includes one or more of certification of a transaction, authentication of the parties, distribution of data encryption/decryption algorithms, distribution of secret information, recording of the transaction details and arbitration of disputes between the parties concerning the authenticity of the communication. There are drawbacks to the use of such third parties since, for example, the recording of the transaction details by the third party results in the third party having access to confidential information as well. In addition, the need to record and respond to voluminous information requires significant investment in infrastructure, such as server banks, and bandwidth on part of the participants and the third parties. As a result, the choice of suitable third parties worthy of such trust is rather limited with the risk of future conflicts of interest while being accompanied by significant performance and cost penalties.

There are some patents describing the use of such third parties. For instance, in U.S. Pat. Nos. 5,790,677 and 6,560,581, a trusted third party is used as a credential binding authority to register parties to a transaction and then to authenticate them using their registration information when a transaction is initiated. Thus, the credentialing party is privy to the otherwise confidential information about all of the parties in the subsequent transaction. Moreover, the parties subsequently exchange commercial documents and information but with little recourse if any particular communication fails. Thus, if an offer was made then the party making the offer may not know whether a delay in receiving an acceptance is due to a network problem or due to a rejection of the offer.

In U.S. Pat. No. 6,199,052, a trusted third party acts as an intermediary and a non-repudiation authority that prevents either party to a transaction from denying receiving a message that has actually been received. In U.S. Pat. No. 6,327,656, a trusted third party certifies e-mail transmissions for subsequent verification and authentication. In both of these patents, the trusted third party has a significant amount of information about the transacting parties. Further, in the event of a suspected breach it is not clear if the breach has actually happened. For instance, the problem of knowing whether a message has actually reached a party or a network failure has taken place may prevent one or more parties from acting in a timely manner. While this may not be a serious drawback in the context of low throughput transactions, in a high throughput transaction context this could be a serious and costly impediment.

Further, the prior art third parties could themselves be commercial entities that if provided access to confidential commercial information may present a security risk that is only heightened if they are also storing or archiving such information. The concern with the unfettered access to credit card and identifying information due to the bankruptcy of many web-based companies is another example of the danger posed by third parties having too much information. Yet another example is the archiving of text messages by text messaging service providers due to the possibility of contested bills despite the security risk posed by such a cache, which may be a target for unauthorized or unexpected access for reasons unrelated to establishing a transaction. Moreover, such an abundance of information may further load the networks, reduce efficiency and may reduce the possible throughput rate for electronic transactions that may require additional investment in resources to provide a required transaction handling capacity. Thus, asking far too much or too little of third parties or trusted intermediaries presents additional problems.

Although prior art apparatus and methods address some security aspects of electronic transactions, such as privacy, authentication and access control, they are still unreliable when an anomaly in the expected flow of electronic transaction occurs. Specifically, none of the above methods or systems adequately enable the trusted third party to resolve issues that might arise due to a disrupted transaction due to the lack of technical means to timely detect and act on the knowledge of such disruptions. For instance, in the case of certified e-mail, if an e-mail reached its destination but a certificate of the transmission has been lost for one of the above reasons, the sender will be inclined to retransmit the e-mail assuming it never reached its destination. Depending on the circumstances, such retransmission may have unintended, and sometimes disastrous, results: if, for example, the original e-mail was directed to a stock broker with a request to purchase certain number of share of stock, and it was received and request was processed, the second e-mail making the same request may result in unintended purchase of additional shares of stock. Accordingly, the prior art trusted-third-party solutions, such as e-mail certification, are unreliable because they leave one or more parties guessing as to the cause of a disruption rather than flagging a disruption to allow a rapid response the transacting parties.

SUMMARY OF THE INVENTION

The present invention improves reliability of electronic business processes by means of a third party capable of effectively detecting and notifying transacting parties of an anomaly in the expected flow of electronic transactions. The third party requires a low overhead, much of which is incurred when an anomaly occurs, thus making the system and method in accordance with the invention suitable for high throughput electronic transactions. Further, the third party does not need to have access to confidential information.

Commercial transactions typically require both control and management. Control as used herein refers to the ability to affect the flow of transactions in a content neutral manner while management of a transaction refers to the ability to modulate the flow of transactions and the initiation or termination of transactions based on the content. Thus management, as used herein, requires knowledge of the material terms and conditions in transactions. A party managing a transaction may respond to a particular interruption in electronic communications by entering into a different contract or negotiations and the like. However, a party controlling an electronic transaction only observes, validates and certifies various combinations of electronic communications without requiring knowledge of the underlying details. This separation of functions is useful in setting up high throughput electronic transactions and distributed computing.

A system in accordance with the invention may comprise: (i) participants; (ii) one or more third parties acting as a validation authority; (iii) a logical boundary at which control of communications is undertaken by the validation authority; (iv) validation rules specifying parameters for observation, validation and certification; and (v) service pairs organized into business processes such that the service pairs exhibit at least a partial order. The last two components may be specified by way of one or more agreements that allow and specify the nature of information to be observed in order for the validation authority to perform its control functions for executing a business process.

Thus, in the context of the present invention, a control process may require as little as validating an electronic communication by determining that the electronic communication as sent by one party was received by a second party in an uncorrupted state. Further, a validation report may validate a request/response pair forming a service pair by combining validation of an underlying request communication and a response to the request communication. In accordance with the invention, a validation report is not required for each service pair. Instead, a validation report is used as an event or an indicator, which may be used to direct additional transactions. Further, a business process comprising several service pairs may be certified based on detecting whether a required partial order of service pairs was actually observed and underlying validation reports. Accordingly, in the broadest sense, control includes observing, validating and/or certifying electronic communications.

Significantly, control, as used herein, does not include managing an electronic transaction by actually accessing or acting upon the details in an observed communication, which details may well be kept confidential. While in some embodiments of the invention, the same party may perform some control as well as some management functions, the chosen description allows the description and implementation of an efficient control function that does not compromise the confidentiality or security of the observed communications. Thus, in a high throughput electronic transaction environment, such an arrangement allows validation of many transactions without raising security concerns. Further, the validation authority is then a third party that does not require the degree of trust required by the prior art since it is typically not trusted with highly confidential information. In a related aspect, the validation report may be provided or its existence confirmed as required in substantially real time due to the low overhead resulting from the separation between the control and management functions. The validation authority only needs to be trustworthy for the purpose of the contemplated electronic transactions since it need not serve as a repository of confidential information. This factor alone makes the task of managing a business process easier with only the control function transferred to a third party acting as a validation authority.

In a preferred embodiment, the validation authority validates a communication by detecting a plurality of specified parameters. An indicator based on the observed communication at a sender is then compared to a similar indicator based on the state of the communication at the receiver end. The term 'state' here does not necessarily require a knowledge of all possible parameters, but rather reflects an imperfect knowledge based on the information required to generate indicators. Thus, a state of a communication may include noting whether a particular field is present and whether the value for that field is a specified value. Such a definition allows one to ascertain, e.g., whether a party has been successfully authenticated from the response (to a request for authentication) indicating 'SUCCESS.'

Then validation typically requires determining that two indicators are identical, or as expected, thus providing evidence that the sent communication is the same as the received communication. Advantageously, the generation of indicators may be performed by deploying software agents that may send a hash based on the observed communication as an indicator of the observed communication to a validation authority. A hash, or similar strategy, maintains the confidentiality of the communications, reduces the amount of information to be transmitted to the validation authority, and allows automation of the control function to efficiently handle electronic communications while maintaining high throughput. Notably such an indicator may further include only some portions of the underlying communications. It may also include additional parameters that are not a part of the communication.

In another aspect, the use of specific rules under agreements controlling the validation authority, and the transacting parties allows customization of the control function for particular contexts. For instance, in a highly security sensitive environment, it may be important to not allow the use of proxy servers and instead specify that the sender and receiver of communications be directly connected. The observation of the sender's address in a communication and its comparison to the sender in the message as received, which may be different due to the use of a proxy server in the communication, flags the use of a proxy server.

The validation authority merely flags that the sent and received communications are not in the same state. The participants decide whether to manage the transactions by terminating or otherwise sequestering contacts over such a suspicious communication link. Thus, the validation authority need not even know the significance of its flagging such communications. It should be noted that such an event may not even be flagged by the validation authority if the underlying agreement did authorize observation, directly or indirectly via a hash etc., of parameters that included the sender's or receiver's IP addresses. Thus, the participants have complete control by way of their agreements with each other and the validation authority to ensure that events of interest are flagged and reflected in validation reports or certificates.

In another aspect, the method of the invention includes generation of a certificate in the process of certifying a business process. A business process is conveniently understood to comprise a plurality of service pairs such that execution of a service pair may be a condition precedent for carrying out another service pair. Thus, the existence of a validation report based on the first service pair may satisfy the condition precedent for carrying out the second service pair.

In another aspect, a business process may not require the transacting parties to be the same for each of the service pairs. Thus, if a first service pair comprises authentication of a first party with a second party, a second service pair may be a transaction between the first and a third party. Further, the plurality of service pairs in the business process are required to be executed in accordance with at least a partial order. The partial order merely specifies that, for example, the first service pair is required to be executed prior to the execution of the second service pair. Then, the execution of the second service pair may be in response to detecting a validation report corresponding to the execution of the first service pair. This allows, in the example, preexisting agreements between the second and third parties to establish trust relationships that are local to them without requiring exchange of the first party's confidential information between the second and the third parties.

Certifying a business process may include generating a certificate indicating a result of determining whether the plurality of service pairs were executed in accordance with the partial order or alternatively, whether the plurality of service pairs were not executed in accordance with the partial order.

In another aspect of the invention, a software agent may be placed at a logical boundary, that itself may be specified by an agreement. The validation authority is responsible for control of communications only beyond this logical boundary, while the transacting party is responsible for the control of communications on the other side of the logical boundary. Without limitation such a logical boundary may be specified by, for example, one of a time point, completion of a specified service pair, a firewall, and a request for initiating the observation, validation, and certification of communications by a party to the transaction. It should be noted that a firewall is a logical entity rather than being exclusively understood to be a physical device.

In another aspect, an indicator of the state of an observed communication is received from a sender software agent or a receiver software agent. These software agents only extract the allowed information, i.e., corresponding to the specified parameters. The software agents may further process the extracted information to generate a hash, and/or encrypt it prior to sending it to the validation authority. The known methods for sending documents securely with the use of digital signatures and hashes may be used to perform this step. Such use of software agents reduces the amount of information actually sent to the validation authority. Further, it ensures that confidential information does not leave the context of the transaction.

Suitable specification of validation rules allows dispute resolution procedures to be built into electronic transactions by providing the reports and certificates of the validation authority to adjudicate disputes or remove uncertainty that may arise if there is a disruption in electronic communications. Thus, some validation rules may include provisions for acting in the event a particular validation report is not available at a specified time point. A party may then be relieved of a possible liability by clarifying to all parties the agreed upon conduct in such scenarios. Importantly, the required reports/certificates are not only received in substantially real time or at about prescribed time points, but the communications between the transacting parties are assured to be reliable without having the validation authority act as a gateway or a firewall that actually manages what data gets through.

In another aspect, a system suitable for automated implementation of a business process subject to such agreements between two or more parties in accordance with the invention may comprise: business process means, validation means, validation rules, and a logical boundary for exercising control.

Business process means may include a direct or indirect specification of the service pairs forming the business process with the required partial order for execution of the service pairs. These means may include, for example, in computer executable form, provisions in an underlying agreement specifying the service pairs for observation. Thus, code causing a server or client device to request observation of a service pair and check whether it is allowed to execute to ensure compliance with a partial order would be a possible implementation of business process means.

Validation means are authorized to observe communications relating to one or more service pairs by collecting predefined information to define a state of an observed communication. Examples of validation means may include software agents for validation authorities that may be deployed to observe the communications as specified. They may further include communication links to a party in an electronic transaction and even a validation authority depending on their configuration. Typically, validation means are capable of implementing validation rules, and possibly generation of validation reports and certificates.

Validation rules specify parameters to be observed for validating the observed communication by a suitable comparison. Typically, a validation rule may include a specification of syntactical components and structural components in specifying the parameters for observation. The parameters for observation are chosen such that they are sufficient for confirming whether an error or another condition of interest exists. However, since the contents of a communication are typically not recorded, a hash of such contents may represent the contents when applying validation rules.

Alternative validation rules may specify that only an authenticated user may access specified information. For such rules, the observation of parameters attesting to either successful authentication of a user or the presence of authenticating information in a request may be allowed without access to the confidential authenticating information itself, thereby solving possible privacy problems. In the absence of the confidential authenticating information, it is not possible to misuse it another transaction. A comparison between a state of a communication sent by a party and the state of the corresponding communication received by the target party, ensures that the transmission was error free without requiring access to the information contained in the communication itself. Indeed, a possible validation rule may require comparing two fields in a single received communication to ensure that it is genuine.

The validation means may further assist in synchronizing execution of several service requests. Upon a request for a service or business process by a first party, one or more parties capable and willing to participate may respond by requesting a specification of a suitable logical boundary. Validation means may then respond to such requests by selecting the required number of parties based on one or more of relative timing of the requests, available resources, and a preference of a party. Further, the parties whose requests were not honored are free to compete for executing other service pairs. Generation of a suitable validation report by the validation means may inform them of the result of a particular selection.

The system may further comprise a system interface that would include a specification of protocols to ensure that the various components can work together. This may include, without limitation, implementing XML or SOAP based communications between the participants and the validation authorities so that the validation rules are implemented and reports generated can be acted upon. Of course, any other presently known or future developed communication protocol suitable for that purpose can be used as well.

The invention is further described in detail below with the help of the following illustrative figures.

BRIEF DESCRIPTION OF DRAWINGS

The present invention will be described next with references to the following drawings.

FIG. 2 illustrates an exemplary embodiment of a cooperation agreement specifying validation rules and the like.

DETAILED DESCRIPTION OF THE INVENTION

Figure 1:
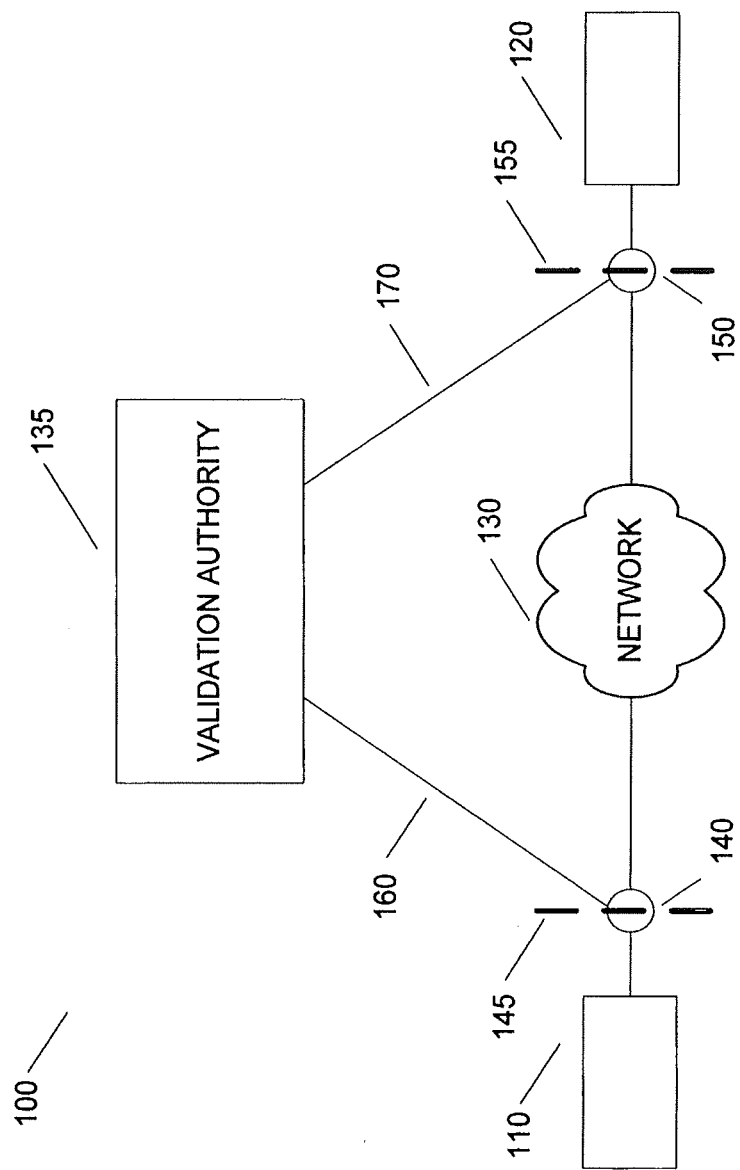
FIG. 1 schematically illustrates a communication network in which the present invention may operate.

In an aspect, the present invention improves security, reliability and efficiency of distributed electronic business processes by means of a third party that detects an anomaly or interruption in the expected flow of electronic communications. The third party provides control functionality without having access to confidential information that is needed for management functionality.

Electronic transactions involve at the lowest level a 'communication' from one party to another party. Such communications may be organized into service pairs, each service pair comprising of a request communication and a response thereto. This description is useful in a server based environment where clients contact servers willing and able to provide a desired service. At the next level, a plurality of service pairs are organized into a business processes such that the plurality of service pairs exhibit at least a partial order.

Commercial electronic transactions typically require both control and management. Control refers to the ability to affect the flow of electronic communications in a content neutral manner while management of a transaction refers to the ability to modulate the flow of transactions based on the content. Thus management of the transaction requires knowledge of the content of the communications since it relates to the material terms and conditions. In contrast, control would flag events of interest based on detection of bottlenecks, failure of a communication link, mismatch between addresses for electronic communications, whether a message was actually delivered or whether a response to a message was sent/received, or other similar considerations. A party managing a transaction may respond to a particular interruption in electronic communications by entering into a different contract or negotiations and the like. However, a party controlling an electronic transaction only observes, validates and certifies various combinations of electronic communications with little knowledge of the underlying details. This separation of the management and control functions is useful in that it allows a neutral third party to establish facts in and automate dispute resolution by providing information limited to whether a message(s) or pre-defined part thereof was delivered and the like.

A control functionality may be able to certify that a specific communication of interest actually took place. Since, control does not include managing an electronic transaction by actually accessing or acting upon the confidential details, this separation of control from management allows implementation of an efficient control function that does not compromise the confidentiality or security of the observed communications. Thus, in a high throughput electronic transaction environment, such an arrangement allows validation of many transactions without raising security concerns.

The separation of control from management is possible by specifying suitable validation rules that determine the parameters for observation, resulting in validation and certification of electronic communications. It is convenient to think of the third party as validating individual electronic communications, issuing validation reports for some service pairs, and issuing certificates for business processes in accordance with the validation rules.

Another control function is in recognizing one of several service providers for a service pair. If several servers can serve a particular user request, they respond to the third party with a request to establish a logical boundary for observation of electronic communications in servicing the user request. The third party then selects one or more of them by sending them validation reports indicating whether they are free to bid for serving another request. Thus, the validation reports may be used to synchronize execution of service pairs in a business process such that they are executed in accordance with the specified partial order (checked by reference to validation reports) and to distribute execution of service pairs between servers to effect distributed computing with the third party operating as a low overhead engine.

A business interaction may be conceptually separated into three phases: a registration phase, a transaction phase, and a certification phase. During the registration phase, each of the parties desiring to participate in a business process register with the third party acting as a validation authority. Registration may mean that the parties accept, for the agreed set of business processes, the validity of the signed reports generated by the third party concerning execution of the services and business processes.

The parties then further agree to cooperate for carrying out one or more business processes, where an agreement may define a business process as a partially ordered set of service pairs. A service pair is a request combined with a response thereto The cooperation agreement further defines various technical and organization parameters that enable the trusted third party to monitor execution of the transactions. In particular, such parameters may include but are not limited to the cooperation rules, organizational procedures and the system interfaces of the registered parties.

During the transaction phase, the third party controls the execution of the business process to the extent of its allowed observation, validation and certification functions pursuant to the business process rules, which are a subset of cooperation rules. This monitoring is preferably performed transparently by means of two parallel connectors between each transacting party, which allows monitoring of the data entering or leaving its source and destination points. This is sufficient for the third party to provide transmission verification and non-repudiation services without storing or otherwise being aware of the content of the communications themselves. This lack of awareness of content refers to the fact that the third party only determines a state defined by the parameters it is allowed to observe. It, typically, will not have the authority to cache all of the significant information from a transactional perspective for managing the transaction. Instead, such information may be used to generate a signature in the form of a hash or similar quantity as an indicator of the observations.

FIG. 1 provides an illustrative diagram of a system 100 suitable for implementing a method in accordance with the invention. Participants 110 and 120 communicate over network 130 and over a communication link that includes software agent 140 corresponding to logical boundary 145 proximate to participant 110. Software agent 140 observes communications directed to and sent by participant 110. Similarly, agent 150 is situated at logical boundary 155 close to transactional party 120. Agents 140 and 150 communicate with validation authority 135 over links 160 and 170 respectively.

Figure 2:
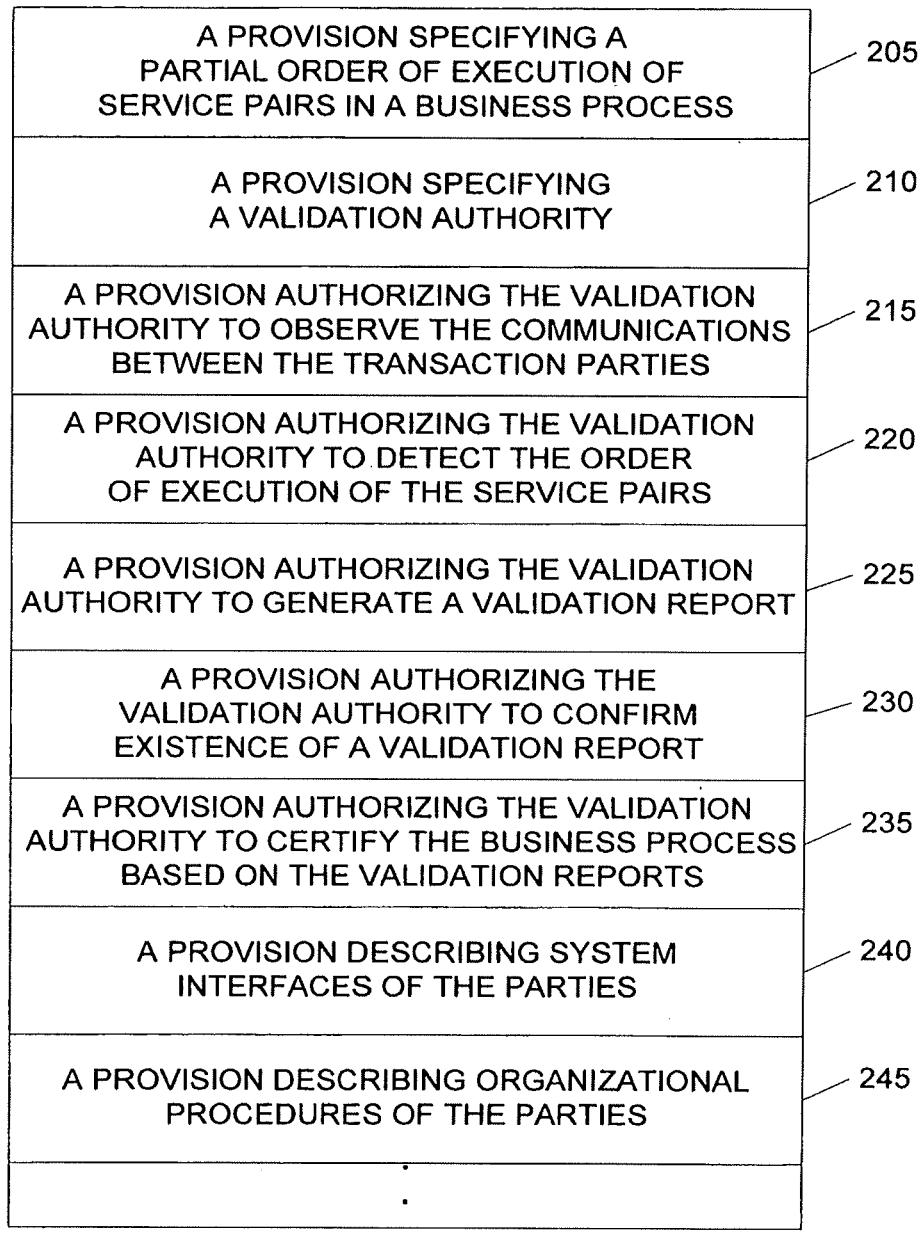

Illustrative FIG. 2 provides a flowchart of possible provisions in an exemplary agreement for implementing an embodiment of the invention. Although the illustrative agreement 200 has many provisions, other agreements used in alternative embodiments of the invention may not include all of them. Agreement 200 includes provision 205 specifying a partial order for execution of service pairs in a business process. Such a provision may typically bind the transacting parties, but may also apply to the validation authority. For example, the validation authority may be required to reveal the existence of a validation report in response to another event or service pair being executed.

Agreement 200 includes provision 210 specifying which third party or entity is to operate in the role of a validation authority. The participants to a transaction are expected to agree to a common validation authority for more effective and efficient processing of electronic transactions. Agreement 200 also includes provision 215 specifying that the validation authority, for example, validation authority 135 of FIG. 1, is authorized to observe the communications between the transaction parties. Such observation is subject to only collecting information that is specified in the agreement. Thus, an agreement may specify that the IP address of a sender is not to be observed, but a status field in an XML encoded message is to be observed to detect a state, such as an input is acceptable or there are no errors and the like.

Agreement 200 includes provision 220 specifying that the validation authority is allowed to or even required/expected to detect the order of execution of service pairs as specified. Further, agreement 200 includes provision 225 specifying that the validation authority is required to generate validation reports for one or more service pairs. The validation authority, pursuant to provision 230 in agreement 200, can confirm the existence of a particular validation report. Such confirmation may indicate successful completion of a particular service, e.g., authentication of a particular party by a trusted or known party. Further, agreement 200 includes provision 235 specifying that the validation authority may certify a business process based on the validation reports of one or more services included in the certified business process.

In another aspect, agreement 200 also includes a provision 240 specifying of one or more interfaces to allow different entities to communicate with each other. Such interfaces may specify the format or other features significant for communication. Further, agreement 200 includes provision 245 specifying organizational provisions that may be required for proper transactions with the validation authority or each other.

Figure 3:
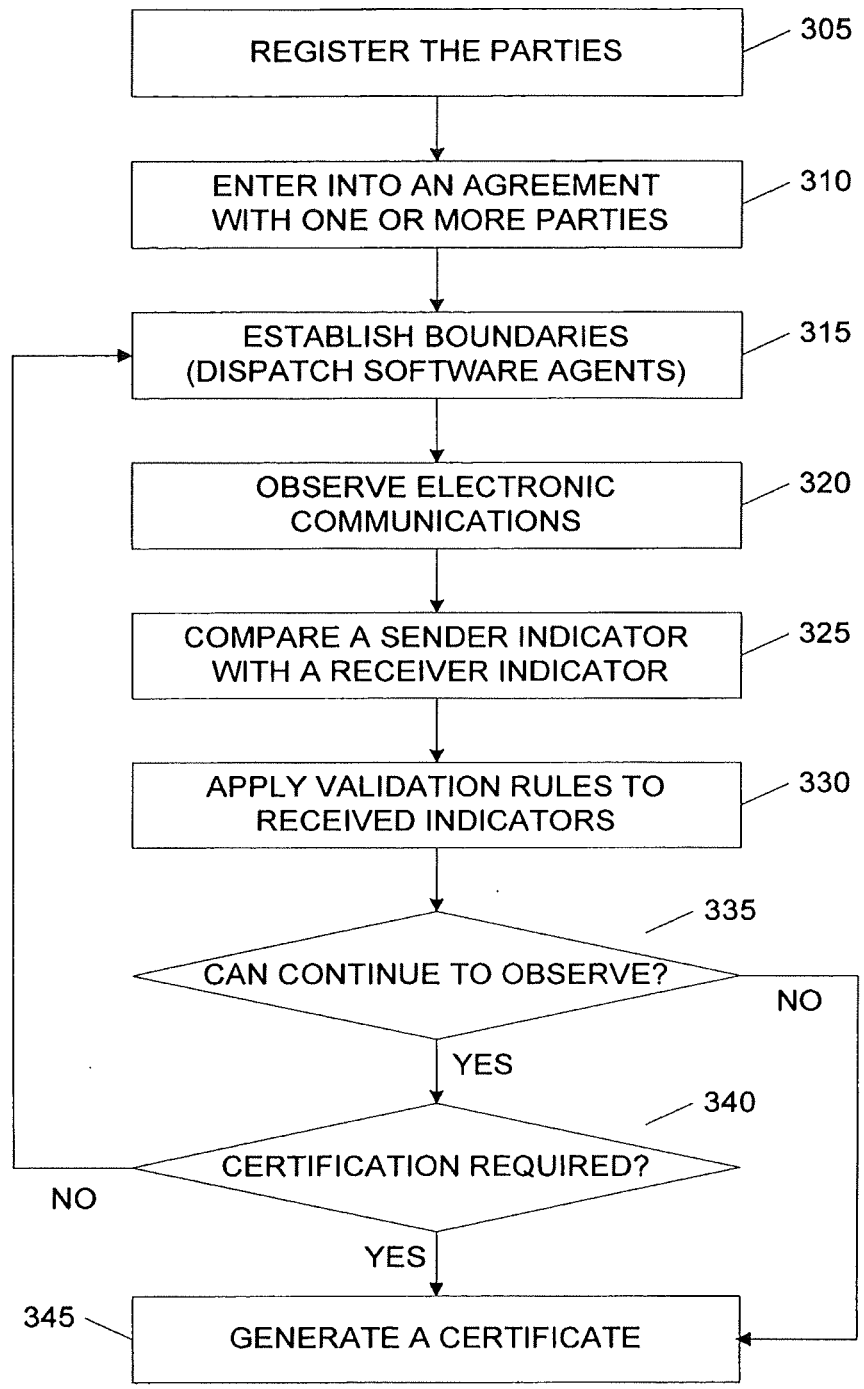
FIG. 3 is flow chart illustrating operations conducted by the validation authority in an embodiment of the invention.

In an exemplary interaction with the validation authority, FIG. 3 depicts some steps that may be carried out by a validation authority. It should be noted that not all embodiments of the invention require that these illustrative steps be carried out by the validation authority. During step 305, validation authority registers participants to an electronic transaction. Control flows to step 310, in which the requisite agreements are entered into by the various parties. Then the registered parties establish logical boundaries by requesting the validation authority to observe communications between the parties. In turn, during step 315, the validation authority dispatches software agents to the registered parties for assisting in the observation of the communications. In one embodiment, a party initiating the transaction may contact the validation authority to establish the boundaries (e.g., using the AskFor™ functionality). The parties are responsible for control on their side of the logical boundary while the validation authority is responsible for the control functionality on its side of the logical boundary. The validation authority may also contact other parties to confirm their acquiescence to the specified boundaries and then dispatch software agents to all participating parties.

The electronic communications between the transacting parties are observed during step 320 by the software agents, which send indicators to the validation authority to assist in the validation process. Next, in step 325, the observed service pairs are compared and then any additional validation rules applied during step 330. If the observation is acceptable and there is no disruption of the ability to observe, control flows from step 335 to step 340, whereby, in the normal course of transaction, the presence and operation of the validation authority is almost transparent and insubstantially intrusive. However, if the ability to observe is adversely affected, then the method terminates with control flowing from step 335 to step 345 and the certificate is generated in step 345.

During step 340, if a certificate is not required, i.e., the business process has not terminated, control flows back to step 315 for setting up observation of a new service pair, if required. Otherwise, the certificate is generated to inform the parties of the status of the business method. Typically, if all of the service pairs have not been executed, then the business process is not considered to be complete. However, in some scenarios, the required number of service pairs may not be fixed a priori. Thus, the execution of the business process may be managed dynamically.

Figure 4:
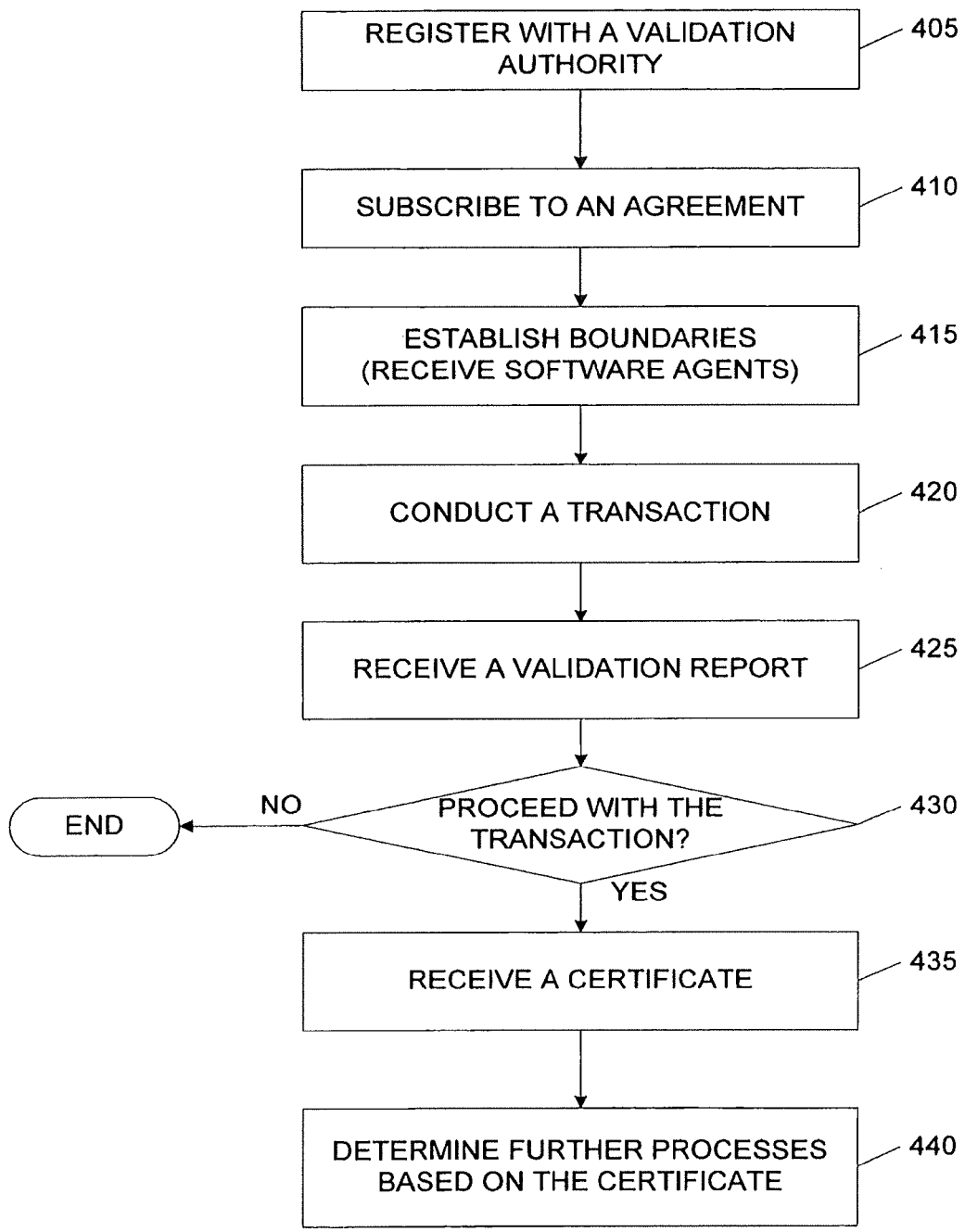
FIG. 4 is a flow chart illustrating operations conducted by a party in an embodiment of the invention.

FIG. 4 illustrates steps conducted by one or more transacting parties with respect to the validation authority in accordance with one embodiment of the present invention. In step 405, one or more parties who desire that their transactions be controlled by a validation authority register with validation authority. In step 410, the parties subscribe to an agreement with the validation authority. An exemplary agreement was described above with reference to FIG. 2. Once one of the parties is ready to initiate a transaction, in step 415, it contacts, for instance using the AskFor™ functionality, the validation authority to establish a logical boundary for the observation, validation, and certification of communications between the transacting parties. In turn, the validation authority may contact the other participating parties to confirm their acquiescence to the specified boundary and dispatches software agents.

Next, the validation authority observes the communications between the parties in step 420. Once a service pair requiring a validation in accordance with the validation rules is observed, the validation authority issues validation reports. In step 425, the registered parties receive the validation report and decide whether or not to continue the transaction during step 430. If the transaction is to be terminated, the method terminates after step 430. If the received validation report is favorable, for instance, indicating that the request and response communication complied with the validation rules, the parties continue their communications until the next report is generated by the validation authority. In step 435, following validation of service pairs specified in agreement, a certificate is received from the validation authority describing the outcome of a business process. Pursuant to this certificate, in step 440, the party may determine whether or not to proceed with a next business process.

Figure 5:
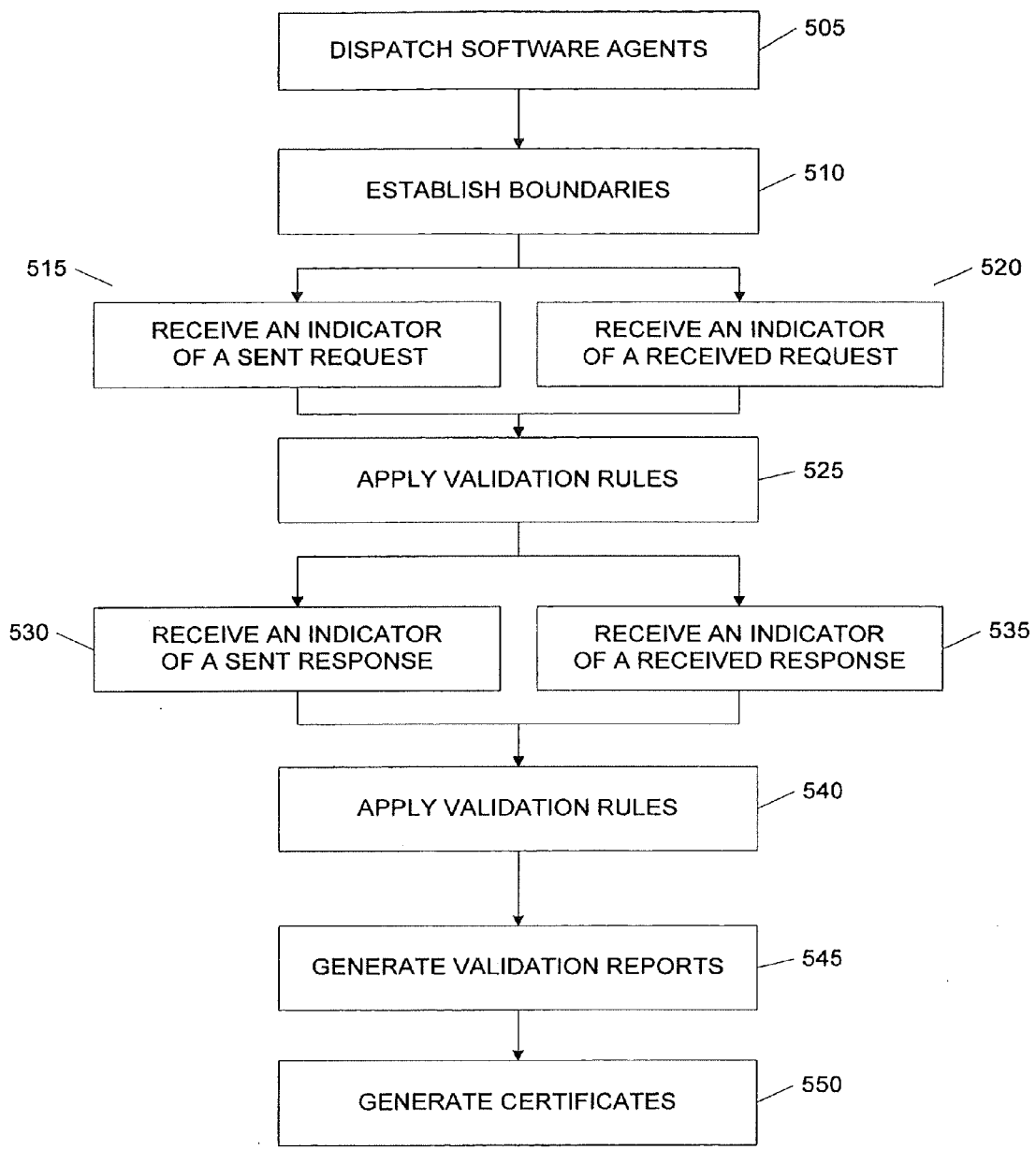
FIG. 5 is a flow chart illustrating in more detail operations conducted by the validation authority in an embodiment of the invention.

FIG. 5 describes in more detail operation of the validation authority in accordance with one embodiment of the invention when no anomaly or interruption occurs in the course of the transaction. Following steps 505 and 510, in which participating parties register with the validation authority and establish boundaries, the validation authority observes communications between the registered parties. In steps 515 and 520, the validation authority receives indications of a sent request and a received request from its software agents. In step 525, the validation authority applies the validation rules for this specific business process to ensure that the request is authorized. For an authorized request, the validation authority awaits an indication of a response. In steps 530 and 535, the validation authority receives indications of a sent response and a received response from its software agents. In step 540, the validation authority applies the validation rules to determine whether the response is acceptable in accordance with the validation rules, e.g., whether it is authorized, or corresponds to the received request and the like. In step 545, the validation authority generates reports to the registered parties validating the service pair. It should be noted that there is little disruption due to the generation of the report since it advantageously is in a default low overhead form. For instance, if the next service pair is requested then if everything is ok, the update of the software agent is provided corresponding to a satisfactory validation. Otherwise, the validation authority generates a validation report detailing or explaining the denial of the software agent update. This use of default responses further reduces the required overhead for control functions. Finally, in step 550, the validation authority issues a certificate to the parties on the outcome of the business process.

Figure 6:
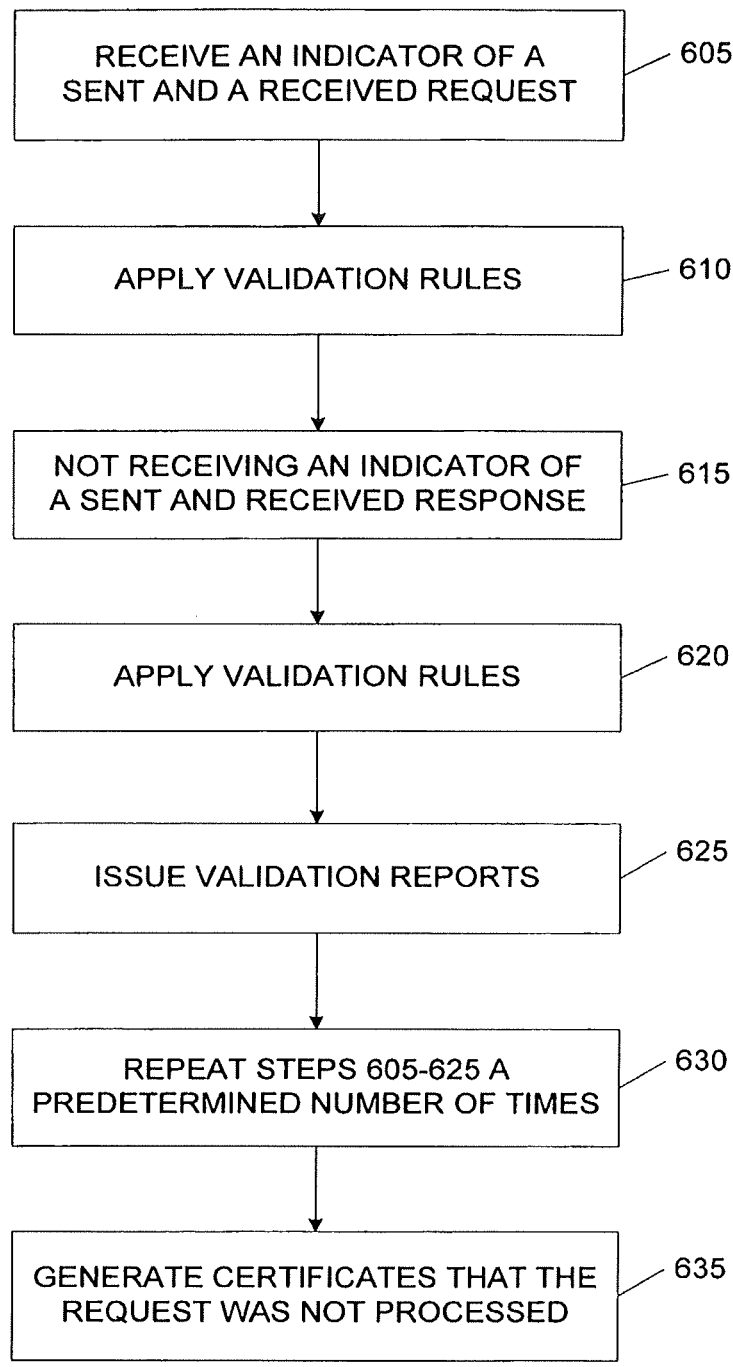
FIG. 6 is a flow chart illustrating the operation of the validation authority when one of the parties to the transaction fails to respond.

FIG. 6 illustrates operation of the validation authority when one of the parties to the transaction fails to communicate in accordance with the agreement. Once the boundaries have been established and the software agents have been put in place, the validation authority receives in step 605 from one of its software agents indication of a sent request and a received request for a particular service. In step 610, the validation authority applies the validation rules for this specific business process to determine whether such a request is authorized by the parties. For authorized requests, the validation authority awaits an indication of a response in step 615. In step 620, the validation authority checks for the expiration of a time limit for receiving a response. If such a time limit has expired, the validation authority issues a report in step 625 to the registered parties that no response was generated. In step 630, the service request may be retransmitted a predetermined number of times and each time validation authority will issue a report if no response was generated. Finally, in step 635, the validation authority will issue a certificate to the registered parties notifying them that the request was not processed.

Figure 7:
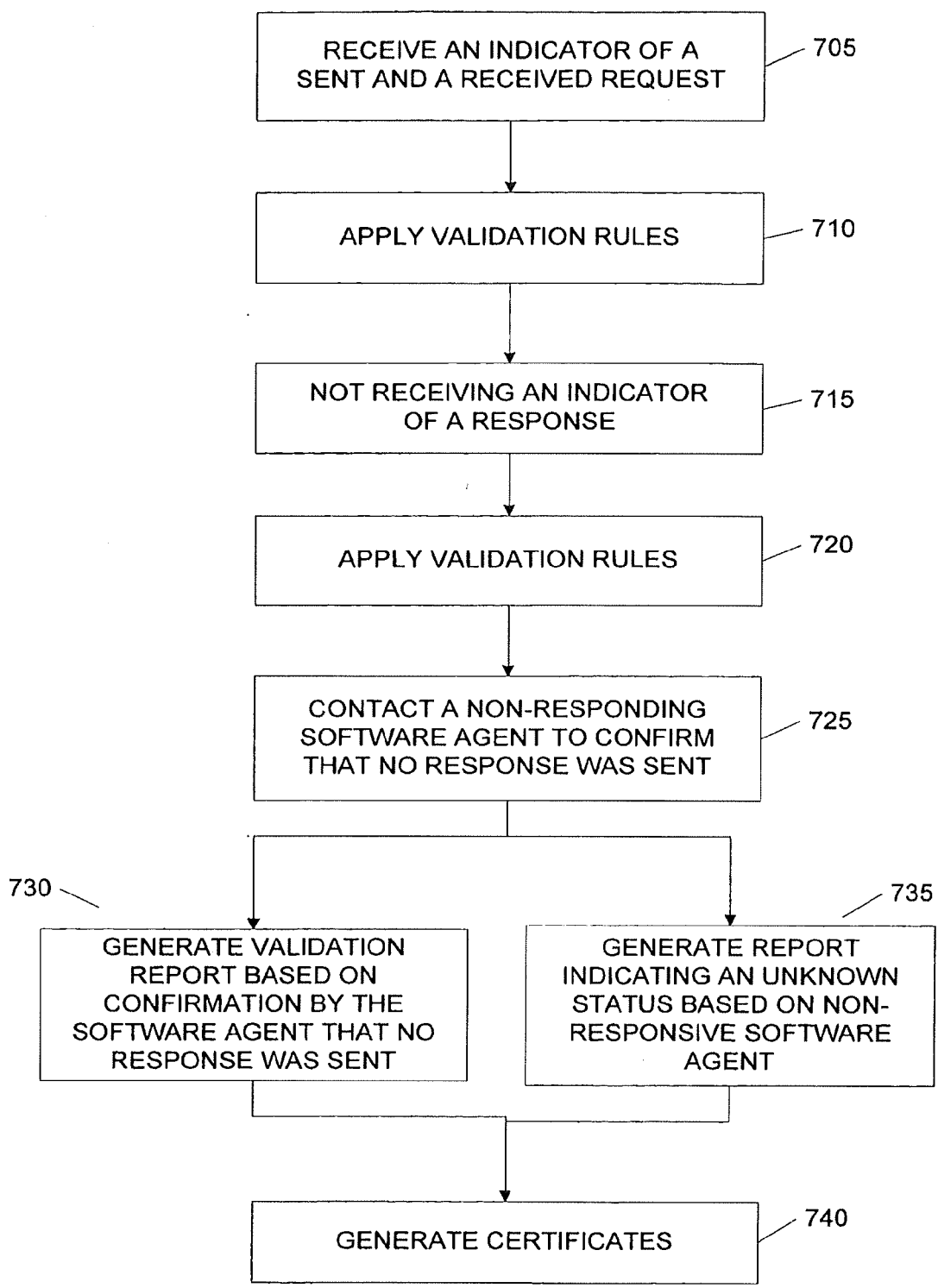
FIG. 7 is a flow chart illustrating the operation of the validation authority when one of its software agents fails to respond.

FIG. 7 illustrates operation of the validation authority when one of its software agents is not responding either due to internal problem with the software agent or network failure between the validation authority and the software agent. In step 705, the validation authority receives from one of its software agents indication of a sent request and a received request. In step 710, the validation authority applies the validation rules for this specific business process. For an authorized request, the validation authority awaits an indication of a response. In step 715, the validation authority fails to receive an indication of a response. In step 720, the validation authority applies its validation rules and contacts, in step 725, the non-responsive software agent to determine whether or not a response was sent. If, in step 730, the software agent confirms that no response was actually sent, validation authority sends reports notifying the registered parties that the request was not processed. If, in step 735, the validation authority cannot reach the non-responsive software agent, it generates reports notifying the registered parties that the status of the transaction is unknown and authenticity of any received response is unknown. Finally, the validation authority generates certificates in step 740 on the outcome of the transaction, and may subsequently try to resolve the problem.

Figure 8A:
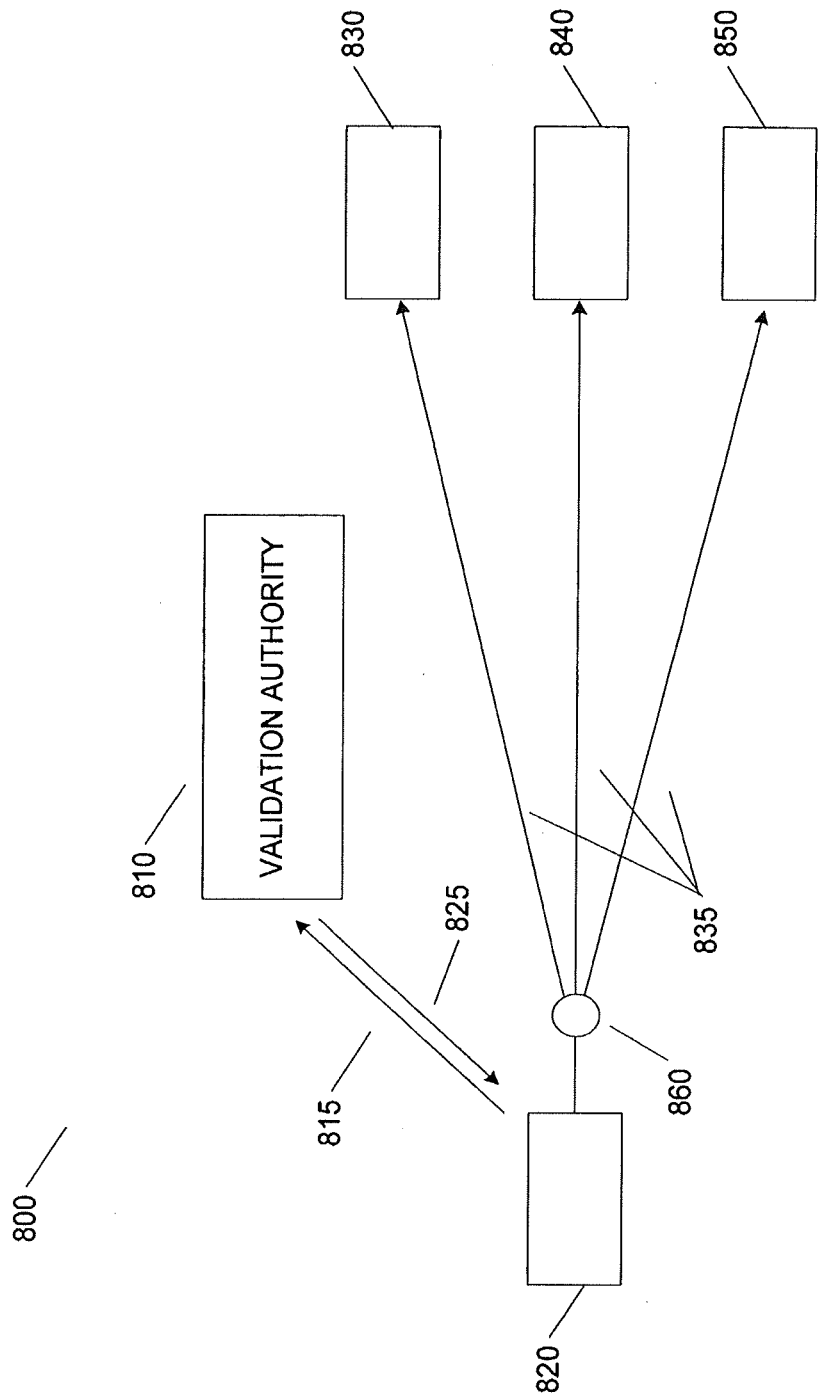
FIG. 8 A though C schematically illustrate operation of the validation authority in a distributed computing environment in accordance with an embodiment of the invention.

In another embodiment of the invention, the validation authority may assist in synchronizing execution of several service requests from a client to several servers operating in a distributed computing environment. With reference to FIG. 8A, client 820 sends request 815 to validation authority 810 for software agent 860 and the setting up of a logical boundary for observing one or more service pairs. Client 820 then contacts servers 830, 840 and 850 via links 835 to find out which one, if any will be available for providing the requested service(s). This may in the form of a challenge to prove they have a suitable software agent, and thus are ready.

Figure 8B:
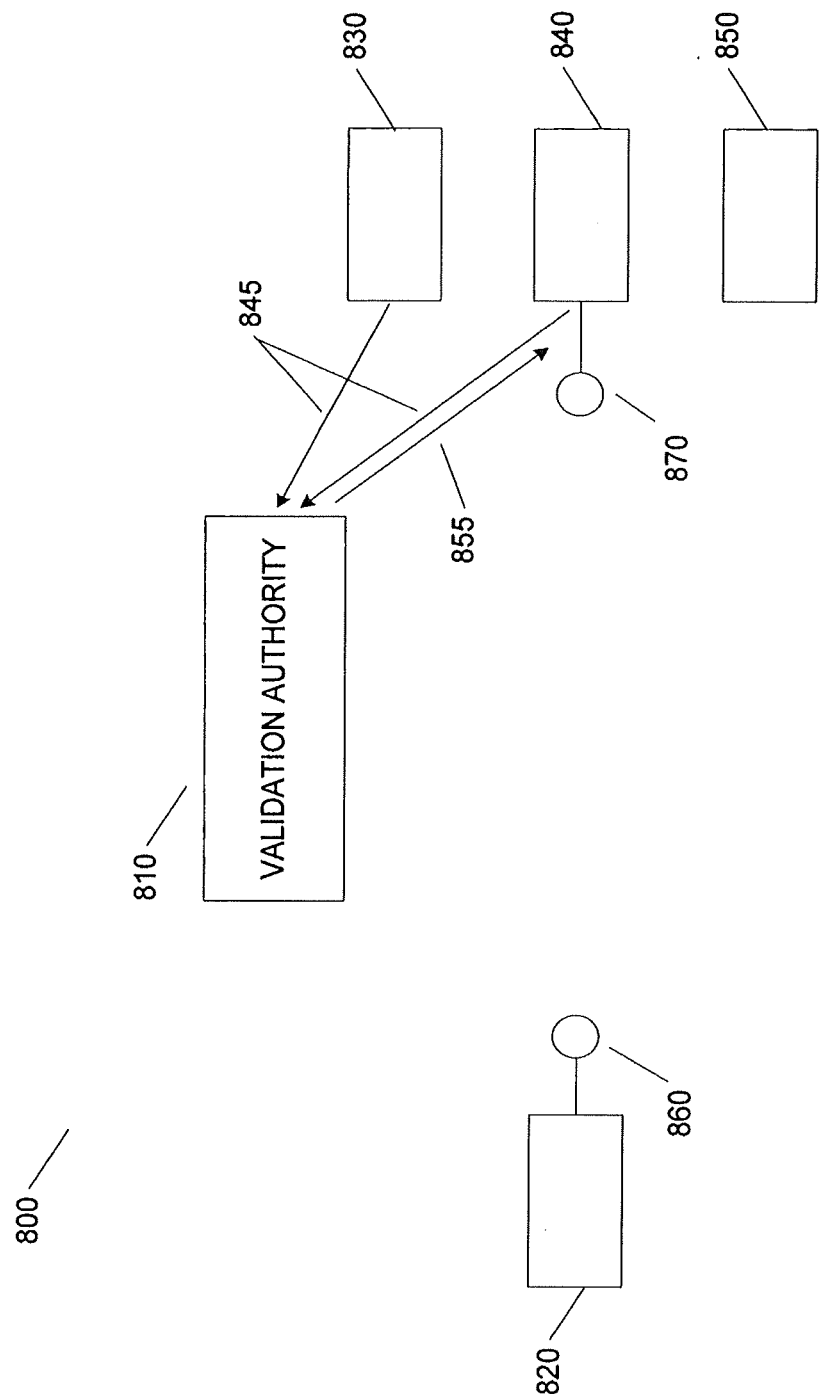

FIG. 8B shows that upon receipt of a request from client 820 to servers 830, 840 and 850 requiring a response comprising an identifier corresponding to that of the software agent present at the client, servers 830 and 840 from servers 830, 840 and 850 send request 845 for receiving the corresponding software agent to validation authority 810. Server 850 exercises the option of not responding to the challenge at all. FIG. 8B also illustrates that since validation authority 810 responds to the request for the required software agent and a suitable logical boundary by more servers than are required for providing the requested service by providing software agent 870 to selected server 840 in response 855 so that it may provide the requested service to client 820.

Figure 8C:
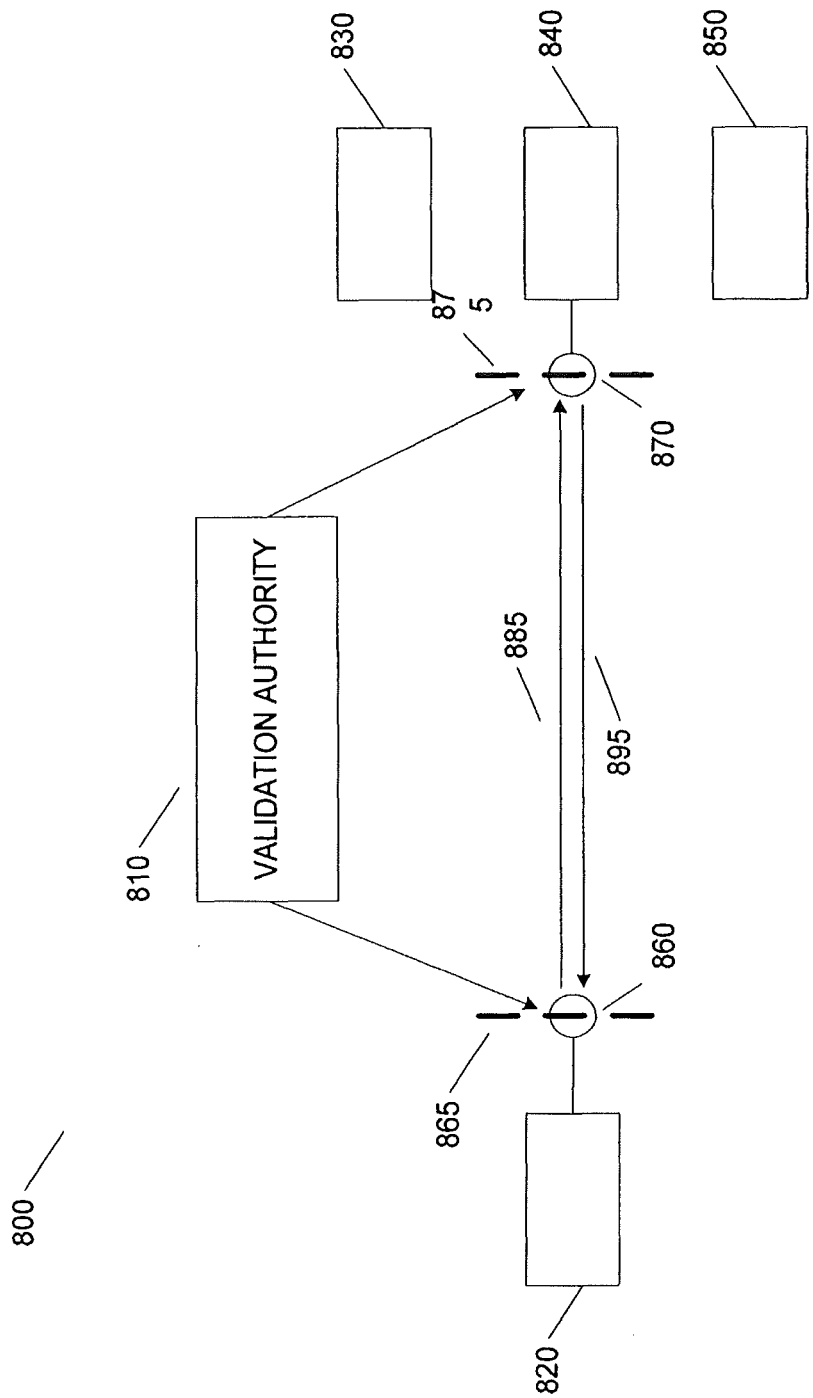

FIG. 8C shows that client 820 and server 840 communicate over links 885 and 895 with software agents 860 and 870 in place to observe their communications at logical boundaries 865 and 875 respectively as shown. Preferably, only those server(s) that are to provide the requested service receive the software agent. The rest may be provided with a denial or may time out and respond to other requests for service pairs. Thus, the validation authority remains a passive entity engaging in control by observing, validating and certifying. It however, also provides a method for synchronizing among and distributing the execution of service pairs to servers 830, 840 and 850 with reduced overhead by merely electing the parties or communications to be subject to its control. In effect, it facilitates control of communications and distributed computing in a multi-server environment.

In another aspect, the cooperation agreement may specify order of preference for selecting between the servers 830, 840 and 850, or the selection may be based on first come first served (FIFO) strategy or on resources available are a particular server. Selected server(s) allow the deployment of the software agent at the logical boundary to start the communications with client 820. Validation authority chooses a server to serve the client's request pursuant to the cooperation agreement. It also generates and sends validation reports to client 820 and the chosen server(s) for which logical boundaries have been established. Then, the transaction observed by validation authority 810 may be initiated.

The cooperation agreement defines the services and the order relations with suitable validation rules and validation report requirements. There is no need to specify the roles of the service providers and users but rather only the rules for assigning these roles are laid out. The partial order is dynamically mapped at run time on the real service providers and on the users. Thus, in response to a user request for a service, several service providers (servers) may respond with a request to set up the logical boundary necessary for control by the validation authority. The actual establishment or failure to do so indicates to the servers whether their offer was accepted. From the network perspective the request ended up being scheduled for execution in a resource sensitive manner dynamically, i.e., distributed computing.

The following examples provide further illustrations of the invention:

In the first illustrative example, a user wishes to initiate a business process to obtain access to the Internet via a network provider. This business process may be described as a collection of the following requests and responses:

A user connects to a network provider (Verizon, Wayport, . . . )

The provider asks the user for a credit card number/payment and the service duration (one day, two days, etc.)

The user sends the credit card number and the requested duration.

The network provider answers with a receipt.

The user can now connect to internet using the network connection for the requested duration time.

Since the user wants to have a record of the transaction and have a receipt in the event there is a dispute, the user also pays, e.g., at a low flat rate, the Validation Authority for providing control functionality in this transaction. The validation authority generates validation reports, which are sent to the user. If everything is fine, i.e., no disputes and the like, nothing needs to be done. The validation reports are on the user PC as its own documentation of the services. Thus, for a low cost the user has availed of the services of a third party, which also does not incur great expense in providing the requested service. No additional user action is required.

Since, the validation authority is not in charge of the service management it does not need to maintain large servers as is typical when the third party is playing the role of a service intermediary, for instance to guarantee the required bandwidth, computational power, and the like.

However, if there is a dispute or something goes wrong in the business process, then proof of what happened may be desired. As an example, the user may wish to have proof of having paid for a piece of merchandise or service over the web. For a fee, the validation authority generates a validation authority certificate containing the validation reports and the related time stamps and signs it. This certificate may then be employed by the user to prove that the requisite payment, in lieu of a lost receipt, and/or demonstrate that other steps were indeed undertaken properly.

Thus the user subscribes to a cooperation agreement with the Validation Authority that asks (AskFor™) to be observed when he starts the described business process. Further, in response to a user demand a certificate of the business process is generated containing the validation reports signed by the Validation Authority, the timestamps and the like.

In the second example, the functionality of the present invention can be use to improve security and reliability of various types of electronic messaging systems. Often email service providers and mobile text messaging providers temporarily store the transmitted emails and text messages to resolve potential disputes arising from customers complaining about allegedly undelivered emails or text messages that they have not sent but are being billed for. Storing such an abundance of information may reduce efficiency and require additional investment in resources to provide a required transaction handling capacity. Furthermore, such storage is also a security risk since an unauthorized third party may obtain access to the stored messages.

Providers of messaging services often retain a copy of the message, particularly text messages, to allow them to prove that the service was indeed used in the event of a later dispute. This repository is a security risk to the participants. The use of the system and method of the present invention enables the providers and users to delegate the responsibility of observing and certifying message transmissions without requiring retention or caching of messages themselves by the use of a Validation Authority. Thus, in the event of a dispute in which proof of message transmission is needed, the service provider may obtain from the Validation Authority a certificate containing the validation reports and the related time stamps to confirm that the message was in fact transmitted and observed at both ends. Similarly, a user of the messaging system can obtain such a certificate from the Validation Authority to assert it against a receiving party who denies the receipt of a communication. The signature of the message contents sent to the validation authority (which may be provided in the certificate) discourages tampering with the message contents.

In the third example, the method and system of the invention provide greater certainty and options to participants in the formation of contracts or tracking performance of a contract and the like. For example, a buyer wishing to obtain a hundred shares places an order with a broker via email. However, although the order message indicated that the offer to buy at the stated price must be accepted by a specified time, the buyer is uncertain in the event there is no response. It is not clear if the order message was actually received and rejected by the broker or whether the acceptance of the offer is held up, or even whether the message was received by the broker.

Subscribing to the services of a validation authority in accordance with the present invention removes this uncertainty due to the execution of suitable validation rule. For instance, if the broker receives the order, the absence of a report of a failure of the broker to receive the request indicates to the buyer that the order message reached the broker. If the time limit set in the order message expires, the validation authority generates a report or certificate, the existence of which indicates to the buyer that he/she may engage in another transaction and to the broker that the time for acting on the order message is past. If the broker does respond within the time limit then both parties know that there was a response and the buyer is free to take the next step.

It should be noted that the validation authority may not know that the request was to buy shares or that the broker declined or accepted the order and the like. Such information is useful for managing the transaction but is not required for the control function.

The fourth example illustrates the scheduling capabilities of the method and system of the invention. For example, with N users and M service providers (could be servers in a network), at least one validation authority and suitable validation rules (in a cooperation agreement), the user requests are distributed between the M service providers with a low overhead. The N users obtain services from the M service providers based on available resources and other factors of interest. Thus, a service pair may start with a request from a user i to a service provider j.

The cooperation agreement may includes provisions for specifying whether the next service pair will be provided by the same service provider j or by another service provider in accordance with some alternative preference to implement business-on-demand.

The cooperation agreement may also provide for the validation reports to indicate whether a request for the next service pair will be sent by the same user i or by another user. This version of validation rules implements a cooperative work model.

The validation authority may also send validation reports to the service provider/user for the next step. In this example, the partial order drives a complex cooperative process with requests potentially being serviced by available servers an din accordance with an order. Note that in this case the structure of the partial order reflects the complexity of the business process.

The fifth example provides some implementation details in an embodiment of the invention. In this example, for observation and validation, we use $$\frac{j}{S_i}$$

as a request of the $j^{th}$ pair of the $i^{th}$ business process.

$$\frac{j}{S_i}$$

is the response for the $j^{th}$ pair of the $i^{th}$ business process.

For observation of each service pair, the communication protocols are preferably disclosed. Some well-known example protocols include: http, telnet, imap, smtp, pop3, ftp and the like. The disclosure may include the data flow structure employed. Example data flow structures include HTML, XML, SOAP and the like.

At the level of service pairs to be observed, the data components to be observed are specified. For example: in a WEB-based communication, a party may directly select fields to be observed on the web interface (the screen) and assign a logical name to them.

For actual observation, a request to the validation authority (i) establishes a logical boundary for the observation, and (ii) requests a software agent to observe communications in accordance with the logical boundary. The validation authority dispatches a specialized software agent compatible with the protocols and data flow structures in use for the service pair. Further, the validation authority opens a session, generates (or take them from an archive of previously generated keys) a pair of unique cryptographic asymmetric keys (public, private), called respectively $K_{pu}$ and $K_{pr}$, and a unique session identifier (S_ID). The software agents dispatched to each party are set to work with the $K_{pu}$ and the S_ID value, preferably for the entire duration of the service pair or even the business process. Thus, each registered party can advantageously use S_ID to identify its session and match up the software agents assigned to observe the communications.

The software agent is configured by the validation authority to observe the specified data components or fields. At run time, the dispatched software agent operates as follows:

First, the software agent, dispatched to each registered party, challenges to verify that both of the parties to the communication have software agents with matching S_IDs. In the event, a party so challenged does not have the required software agent, it sends the received challenge to the validation authority and receives from the correct software agent, or if it fails to so obtain the software agent, it may not respond to the challenge.

Second, the software agent extracts or notes the specified data components in the communications being sent and received in the course of its observation function.

Third, the software agent calculates a signature, also termed an indicator, for example, a hash, of the observed data components.

Fourth, the software agent sends the signatures, the logical names assigned to the data components, and the S_ID to the validation authority.

In response, the software agent receives from the validation authority the validation report of the service pair being observed containing: a unique identifier of the service pair and possibly time stamps.

The software agent also stores in a directory associated with the validation authority, a file ciphered using $K_{pu}$. This file comprises: the signatures; the observed values; the logical names assigned to the data components; the unique identifier of the pair; the time stamp; the S_ID. The file may be accessed both via the unique identifier of the service pair and the S_ID.

Turning to validation, the default validation rules comprise, for example, the validation rules that are always to be applied to each service pair. Some such example default validation rules are:

a) The Validation Reports of the previously executed service pairs in accordance with the specified partial order in the business process must have been generated. This validation rule is applied, for instance, when establishing a logical boundary for observations for a current service pair.

b) The specified parameters for the service pair must have been observed. This validation rule is verified during the execution of a service pair. In other words, if the specified parameters are not being observed then the validation of the service pair fails due to the disruption of the required observation function.

Examples of additional validation rules, for each service pair, comprise:

a) The observations made by a software agent dispatched to the client or user must be equal to the observations made by the corresponding software agent dispatched to the other side. This rule may be applied at run time.

b) The observations made by the software agent equal one or more observations stored in validation reports of corresponding previously executed service pairs. This rule may also be applied at run time.

At run time the validation authority operates as follows:

If a logical boundary and software agents are requested for a first service pair in a business process, the VA opens a session, provides a pair of unique cryptographic asymmetric keys (public, private), called respectively $K_{pu}$ and $K_{pr}$, and a unique session identifier (S_ID). Then the validation authority sets up a directory identified by the opened session, stores in this directory the S_ID, $K_{pu}$ and $K_{pr}$, and sets up the software agent of both parties with $K_{pu}$ and S_ID. For the duration of the business process, each registered party uses the S_ID to identify itself in the business process. The software agent dispatched to each registered party, uses challenges to verify that the other software agent has the same S_ID. As described previously, if a challenged party does not have the correct agent, it may obtain one from the validation authority.

The validation authority also preferably verifies for each of the request and its corresponding response that the Validation Reports of the logically preceding service pairs were generated. The validation authority may also verify that the software agents are sending the indications and the logical names of the observations for the service pair.

The validation authority verifies that for each service pair, the corresponding indicators match. Thus, a sent request and the received request are associated with matching indicators for avoiding being flagged. The validation authority may also verify that for each observation of the communications, the indicator matches the indicator for a prior observation, e.g., which may be stored in a validation report.

In the event one or more observations fails to comply with the validation rules, a message is generated by validation authority. Acting on the messages, possibly taking into account their content and context is in the domain of management.

The validation report is generated if both the request and the response in a service pair have been validated at run time. Alternatively, with an identifier of the service pair, a time stamp of the operations may be generated followed by the generation of the Validation Report. The identifier of the service pair and the time stamp may be sent to the software agent for use in encoding the local observations and storing them locally, possibly as Validation Reports.

A certificate may be generated, for example, in response to generating a validation report of the last service pair in a business method in accordance with the partial order. A certificate may be signed by the validation authority and may be further used by the management functionality. A certificate is generated by the validation authority by retrieving the unique identifiers stored in the Validation Reports of the business process in question.

Advantageously, if the validation authority does not need to archive all of the validation reports. It may instead, for instance, send a report to the transaction parties.

The validation authority, uses the private keys $K_{pr}$ to encode the validation reports and issue a signed certificate, preferably with all the desired observed values. This typically will not allow reconstruction of the confidential contents of the messages since they may be represented by a hash or such indicator.

The illustrative descriptions of the application of the principles of the present invention are intended to enable any person skilled in the art to make or use the disclosed invention. These descriptions are susceptible to numerous modifications and alternative arrangements by those skilled in the art. Such modifications and alternative arrangements are not intended to be outside the scope of the present invention. The appended claims are intended to cover such modifications and arrangements. Thus, the present invention should not be limited to the described illustrative embodiments but, instead, is to be accorded the broadest scope consistent with the principles and novel features disclosed herein and described in the claims presented next.

We claim:

1. A method for mediating communication over a data network, comprising:
receiving over the data network a registration request from a first network node and a registration request from a second network node;
receiving a request over the data network to establish a mediated communication session between the first network node and the second network node over the data network;
generating a specification of one or more interfaces for implementing the mediated communication session between the first network node and the second network node;
transmitting a software component to each of the first network node and the second network node, the software component including the specification of the one or more interfaces;
causing the establishment of the mediated communication session directly between the first network node and the second network node via at least one of the one or more interfaces, and
transmitting a mediated communication of the mediated communication session via a communication link that is independent of a validation node.

2. The method of claim 1 wherein generating the specification of the one or more interfaces includes determining at least one of a communication protocol and a data format for communication over the data network associated with at least one of the one or more interfaces.

3. The method of claim 2 wherein said specification comprises a data flow structure.

4. The method of claim 2 wherein said specification comprises a markup language specification.

5. The method of claim 2 wherein said specification comprises an authentication method.

6. The method of claim 1 further comprising:
generating a specification of a further interface for communication;
transmitting the specification of said further interface to the first and the second nodes; and
receiving via the further interface, an indicator from one or both of the first and second network nodes based on a mediated communication over the mediated communication session, said indicator maintaining privacy of the mediated communication.

7. The method of claim 6 further comprising:
validating the mediated communication over the mediated communication session based on the indicator.

8. The method of claim 7 further comprising:
transmitting validation information to one or both of the first node and the second node, the validation information being based on the indicator.

9. A method, comprising:
receiving a registration request from a first party and a registration request from a second party;
receiving a request to observe communication between the first party and second party;
generating a specification of one or more interfaces to observe communication between the first and second parties;
transmitting a software component to each of the first and second parties, the software component including the specification of the one or more interfaces;
causing the establishment of a communication session directly between the first party and the second party via at least one of the one or more interfaces; and
transmitting a communication of the communication session via a communication link that is independent of a validation node.

10. The method of claim 9 wherein determining the specification of the one or more interfaces includes determining at least one of a communication protocol and a data format for communication associated with at least one of the one or more interfaces.

11. The method of claim 10 wherein said specification comprises a data flow structure.

12. The method of claim 10 wherein said specification comprises a markup language specification.

13. The method of claim 10 wherein said specification comprises an authentication method.

14. The method of claim 9 further comprising:
generating a specification of a further interface for communication;
transmitting the specification of said further interface to the first and the second parties; and
receiving via the further interface, an indicator from one or both of the first and second parties based on a mediated communication over the communication session, said indicator maintaining privacy of the mediated communication.

15. The method of claim 14 further comprising:
validating the mediated communication over the communication session based on the indicator.

16. The method of claim 15 further comprising:
transmitting validation information to one or both of the first party and the second pay, the validation information being determined from the indicator.

17. A system, comprising:
a first network node operable to establish a mediated communication session;
a second network node operable to establish a mediated communication session;
a validation node operable to:
receive a registration request from both the first and second network node;
receive a request over the data network to establish a mediated communication session between the first network node and the second network node over the data network;
generate a specification of one or more interfaces for implementing the mediated communication session between the first network node and the second network node, the specification based on at least one technical or organization parameter included in each of the registration requests;
transmit a software component to each of the first network node and the second network node, the software component including the specification of the one or more interfaces; and
establish the mediated communication session directly between the first network node and the second network node via at least one of the one or more interfaces, wherein a mediated communication of the mediated communication session is transmitted via a communication link that is independent of the validation node.

18. The system of claim 17 wherein the specification of the one or more interfaces includes at least one of a communication protocol and a data format for communication over the data network associated with at least one of the one or more interfaces.

19. The system of claim 18 wherein said specification comprises a data flow structure.

20. The system of claim 18 wherein said specification comprises a markup language specification.

21. The method of claim 18 wherein said specification comprises an authentication method.

22. The system of claim 17 wherein the validation server is further operable to:
generate a specification of a further interface for communication;
transmit the specification of said further interface to the first and the second nodes; and
receive via the further interface, an indicator from one or both of the first and second network nodes based on a mediated communication over the mediated communication session, said indicator maintaining privacy of the mediated communication.

23. The system of claim 22 wherein the validation node is further operable to validate the mediated communication over the mediated communication session based on the indicator.

24. The system of claim 23 wherein the validation node is further operable to transmit validation information to one or both of the first node and the second node, the validation information being based on the indicator.

25. A method for mediating communication over a data network, comprising:
receiving over the data network a registration request from a first network node and a registration request from a second network node;
receiving a request over the data network to establish a mediated communication session between the first network node and the second network node over the data network;
generating a specification of one or more interfaces for implementing the mediated communication session between the first network node and the second network node, the specification based on at least one technical or organization parameter included in each of the registration requests;

transmitting a software component to each of the first network node and the second network node, the software component including the specification of the one or more interfaces;

causing the establishment of the mediated communication session directly between the first network node and the second network node via at least one of the one or more interfaces; and transmitting a mediated communication of the mediated communication session via a communication link that is independent of a validation node.

26. A method, comprising:

receiving a registration request from a first party and a registration request from a second party;

receiving a request to observe communication between the first party and second party;

generating a specification of one or more interfaces to observe communication between the first and second parties, the specification based on at least one technical or organization parameter included in each of the registration requests;

transmitting a software component to each of the first and second parties, the software component including the specification of the one or more interfaces;

causing the establishment of a communication session directly between the first party and the second party via at least one of the one or more interfaces; and transmitting a communication of the communication session via a communication link that is independent of a validation node.

* * * * *